US011475300B2

(12) United States Patent
Yao et al.

(10) Patent No.: US 11,475,300 B2
(45) Date of Patent: Oct. 18, 2022

(54) NEURAL NETWORK TRAINING METHOD AND APPARATUS

(71) Applicant: Huawei Technologies Co., Ltd., Shenzhen (CN)

(72) Inventors: Jun Yao, London (GB); Wulong Liu, Beijing (CN); Yu Wang, Beijing (CN); Lixue Xia, Beijing (CN)

(73) Assignee: HUAWEI TECHNOLOGIES CO., LTD., Shenzehn (CN)

( * ) Notice: Subject to any disclaimer, the term of this patent is extended or adjusted under 35 U.S.C. 154(b) by 480 days.

(21) Appl. No.: 16/714,011

(22) Filed: Dec. 13, 2019

(65) Prior Publication Data

US 2020/0117997 A1 Apr. 16, 2020

Related U.S. Application Data

(63) Continuation of application No. PCT/CN2018/091033, filed on Jun. 13, 2018.

(30) Foreign Application Priority Data

Jun. 16, 2017 (CN) .......................... 201710459806.0

(51) Int. Cl.
  *G06N 3/08* (2006.01)
  *G06N 3/04* (2006.01)
  *G06N 3/063* (2006.01)

(52) U.S. Cl.
  CPC .................. *G06N 3/08* (2013.01); *G06N 3/04* (2013.01); *G06N 3/063* (2013.01)

(58) Field of Classification Search
  CPC ............ G06N 3/08; G06N 3/04; G06N 3/063; G06N 3/084; G06N 3/0635; G06N 7/023;
  (Continued)

(56) References Cited

U.S. PATENT DOCUMENTS

2012/0011089 A1  1/2012 Aparin et al.
2012/0272017 A1  10/2012 Lee et al.
(Continued)

FOREIGN PATENT DOCUMENTS

CN  103810497 A  5/2014
CN  104376362 A  2/2015
(Continued)

OTHER PUBLICATIONS

Su, F., "A 462GOPs/J RRAM-based Nonvolatile Intelligent Processor for Energy Harvesting IoE System Featuring Nonvolatile Logics and Processing-In-Memory," Symposium on VLSI Technology, 2017, 2 pages.
(Continued)

*Primary Examiner* — Duy M Dang
(74) *Attorney, Agent, or Firm* — Conley Rose, P.C.

(57) ABSTRACT

A neural network training method includes inputting neuron input values of a neural network to the RRAM, and performing calculation for the neuron input values based on filters in the RRAM, to obtain neuron output values of the neural network, performing calculation based on kernel values of the RRAM, the neuron input values, the neuron output values, and backpropagation error values of the neural network, to obtain backpropagation update values of the neural network, comparing the backpropagation update values with a preset threshold, and when the backpropagation update values are greater than the preset threshold, updating the filters in the RRAM based on the backpropagation update values.

20 Claims, 7 Drawing Sheets

(58) Field of Classification Search
CPC .......... G06N 20/00; G06N 3/02; G06N 7/046; G06T 2207/20081; G06T 3/4046; G06T 9/002; G06T 2207/20084; G06K 7/1482
See application file for complete search history.

(56) References Cited

U.S. PATENT DOCUMENTS

| | | | | |
|---|---|---|---|---|
| 2013/0132314 | A1* | 5/2013 | Snider | G11C 11/54 706/15 |
| 2014/0353570 | A1 | 12/2014 | Kozlova et al. | |
| 2016/0110124 | A1 | 4/2016 | Camp et al. | |
| 2020/0319998 | A1* | 10/2020 | Wang | G06N 3/084 |

FOREIGN PATENT DOCUMENTS

| | | |
|---|---|---|
| CN | 104463324 A | 3/2015 |
| CN | 105224986 A | 1/2016 |
| CN | 105303252 A | 2/2016 |
| CN | 106201651 A | 12/2016 |
| CN | 106530210 A | 3/2017 |
| CN | 106599586 A | 4/2017 |
| CN | 106650922 A | 5/2017 |
| CN | 106845634 A | 6/2017 |

OTHER PUBLICATIONS

Zhiyuan, J., "Anlysis and Application Research Based on Threshold Adaptive Memristor Model," Southwest University, 2017, Issue 02, 2 pages (abstract).

Shiping, W., "Modeling and Control of Memristive Circuit Systems," Huazhong University of Science and Technology, 2014, Issue 10, 2 pages (abstract).

Gokmen, T., et al., "Acceleration of Deep Neural Network Training with Resistive Cross-Point Devices," Jul. 21, 2016, 13 pages.

Tiejun, H., et al, "Research on multimedia technology 2015—advances and trend of brain-like computing," Journal of Image and Graphics, 2016, Issue 11, 14 pages.

Xia, L., et al., "Switched by Input: Power Efficient Structure for RRAM-based Convolutional Neural Network," 2016 53nd ACM/EDAC/IEEE Design Automation Conference (DAC), 2016, 6 pages.

Wei, L., et al., "Research of Mutual Learning Neural Network Training Method," Chinese Journal of Computers, 2017, Issue 06, 18 pages.

Soudry, D., et al., "Memristor-Based Multilayer Neural Networks With Online Gradient Descent Training," IEEE Transactions on Neural Networks and Learning Systems, IEEE, Piscataway, NJ, USA, vol. 26, No. 10, XP011670715, Oct. 1, 2015, pp. 2408-2421.

Wang, F., et al., "A Sparse Matrix Approach to Neural Network Training," Neural Networks, 1995. Proceedings., IEEE International Conference on Perth, WA, Australia, New York, NY, USA, IEEE, US, vol. 5, XP010156255, Nov. 27, 1995, 5 pages.

Machine Translation and Abstract of Chinese Publication No. CN104376362, Feb. 25, 2015, 9 pages.

Machine Translation and Abstract of Chinese Publication No. CN105303252, Feb. 3, 2016, 10 pages.

Machine Translation and Abstract of Chinese Publication No. CN106530210, Mar. 22, 2017, 16 pages.

Chi, P., "Prime: A Novel Processing-in-memory Architecture for Neural Network Computation in ReRAM-based Main Memory," ACM/IEEE 43rd Annual International Symposium on Computer Architecture, 2016, pp. 27-39.

Tang, T., "Binary Convolutional Neural Network on RRAM," IEEE, 2017, pp. 782-787.

Foreign Communication From a Counterpart Application, PCT Application No. PCT/CN2018/091033, English Translation of International Search Report dated Sep. 12, 2018, 2 pages.

Foreign Communication From a Counterpart Application, PCT Application No. PCT/CN2018/091033, English Translation of Written Opinion dated Sep. 12, 2018, 4 pages.

* cited by examiner

Input neuron input values <ri1, ri2, ..., rin> of an $r^{th}$ layer of a neural network to an RRAM, and perform calculation for the neuron input values <ri1, ri2, ..., rin> based on filters (filter) in the RRAM, to obtain neuron output values <ro1, ro2, ..., rom> of the $r^{th}$ layer of the neural network ⎯⎯ 301

Perform calculation based on kernel values of the RRAM, the neuron input values <ri1, ri2, ..., rin> of the $r^{th}$ layer of the neural network, the neuron output values <ro1, ro2, ..., rom> of the $r^{th}$ layer of the neural network, and backpropagation error values <B1, B2, ..., Bm> of the $r^{th}$ layer of the neural network, to obtain backpropagation update values <C1, C2, ..., Cm> of the $r^{th}$ layer of the neural network ⎯⎯ 303

Compare the backpropagation update values <C1, C2, ..., Cm> of the $r^{th}$ layer of the neural network with a preset threshold ⎯⎯ 305

When the backpropagation update values <C1, C2, ..., Cm> of the $r^{th}$ layer of the neural network are greater than the preset threshold, update the filters in the RRAM based on the backpropagation update values <C1, C2, ..., Cm> of the $r^{th}$ layer of the neural network ⎯⎯ 307

FIG. 3

NEURAL NETWORK TRAINING METHOD AND APPARATUS

CROSS-REFERENCE TO RELATED APPLICATIONS

This application is a continuation of International Patent Application No. PCT/CN2018/091033, filed on Jun. 13, 2018, which claims priority to Chinese Patent Application No. 201710459806.0, filed on Jun. 16, 2017 both of which are hereby incorporated by reference in their entireties.

TECHNICAL FIELD

This application relates to the data processing field, and more specifically, to a neural network training method and apparatus.

BACKGROUND

A neural network (such as a deep neural network) has been widely applied in fields such as computer vision, natural language processing, and big data mining. Neural network computing has the following two typical characteristics.

(1) Computation-Intensive.

An operation mainly performed in the neural network is multidimensional matrix multiplication, whose computational complexity is generally O(N3). In other words, time required for completing an operation on N pieces of data is in direct proportion to the cube of N. For example, a 22-layer GoogLeNet (which is a neural network structure and proposed by researchers of Google) generally needs a computation amount of 6G floating-point operations per second (FLOPS). Therefore, relatively high requirements are imposed on computing hardware and performance optimization.

(2) Memory Access-Intensive.

First, a training process of the neural network usually needs to rely on massive training data. For example, ImageNet 2012 includes 14,000,000 images. Second, the neural network includes connection parameters of hundreds of millions of neurons that need to be frequently updated, especially during training. Third, the neural network generates a large quantity of intermediate results such as gradient information during an operation. Memory access overheads of a large amount of data such as training data, connection weights, and intermediate results impose an urgent requirement for optimization of a data storage structure and computation performance.

An emerging resistive random access memory (RRAM) device is considered as one of devices improving computation energy efficiency of the neural network. First, the RRAM is a non-volatile memory (NVM) and has relatively high integration density. Compared with a flash memory device, the RRAM is more suitable for data access close to a processor attributing to a higher access speed and lower power consumption, and therefore is a non-volatile data storage medium that is quite suitable for application in a device such as a mobile terminal. Second, different from a conventional memory cell that has two values 0 and 1, an RRAM memory cell can represent a plurality of values by virtue of a resistance variable feature. Based on the foregoing features of the RRAM, a crossbar array structure is built using the RRAM. As shown in FIG. 1, a crossbar array structure using an RRAM cell quite adapts to a matrix vector multiplication operation of the neural network.

A multiply-accumulate operation in a digital circuit can be rapidly implemented using an analog circuit form of the RRAM. For example, in a matrix operation C=A×B, corresponding computational complexity for generating n pieces of target data in a column is O(n2). It may be considered that the target data is obtained by multiplying all data of the matrix A by corresponding column data of the matrix B. Assuming that the matrix A is n×n in size and a column of the matrix B is n×1 in size, each element in the n pieces of target data in the corresponding column of the matrix C (resultant matrix) needs to be obtained by performing multiply-accumulate operations for n times, and n×n times of calculation are needed in total. However, during computation of the RRAM, this process may be converted into an RRAM-based analog circuit computation process through collaboration between a digital-to-analog converter (DAC) and an analog-to-digital converter (ADC). Existing work for all elements shows that the crossbar array structure built using the RRAM memory cell accelerates neural network computing and can improve energy efficiency by 100 times to 1000 times compared with a central processing unit (CPU) or a graphics processing unit (GPU).

However, application of the RRAM is restricted by a lifetime of the RRAM. In other words, a lifetime of a single cell in the RRAM is restricted by a write/erase count. When impedance of a single cell changes for a particular quantity of times, an impedance changing ability becomes weak, affecting the lifetime of the RRAM and causing an error. Especially, in a neural network training process, massive synapses and neuron strength training are usually performed for a training set of a large data volume. Therefore, a large quantity of update operations are performed in this process, generating a large quantity of write/erase tasks and directly affecting service life of the RRAM. In addition, frequent update operations also greatly increase a possibility of a potential hard error, affecting reliability of the RRAM. The hard error means that impedance of the RRAM cannot change any longer, and therefore a circuit is always presented as an open circuit (whose impedance is infinitely large) or a short circuit (whose impedance is infinitely small). A corresponding value is stuck-at-0, namely, a stuck-at-0 error, or is stuck-at-1, namely, a stuck-at-1 error.

SUMMARY

This application provides a neural network training method and apparatus in order to prolong service life of an RRAM that performs neural network training.

According to a first aspect, a neural network training method is provided, and the method is applied to a RRAM and includes inputting neuron input values <ri1, ri2, . . . , rin> of an $r^{th}$ layer of a neural network to the RRAM, and performing calculation for the neuron input values <ri1, ri2, . . . , rin> based on filters in the RRAM, to obtain neuron output values <ro1, ro2, . . . , rom> of the $r^{th}$ layer of the neural network, where n is a positive integer greater than 0, and m is a positive integer greater than 0, performing calculation based on kernel values of the RRAM, the neuron input values <ri1, ri2, . . . , rin> of the $r^{th}$ layer of the neural network, the neuron output values <ro1, ro2, . . . , rom> of the $r^{th}$ layer of the neural network, and backpropagation error values <B1, B2, . . . , Bm> of the $r^{th}$ layer of the neural network, to obtain backpropagation update values <C1, C2, . . . , Cm> of the $r^{th}$ layer of the neural network, where the kernel values of the RRAM are matrix values of the filters in the RRAM, and the backpropagation error values <B1, B2, . . . , Bm> of the $r^{th}$ layer of the neural network are obtained based on the neuron output values <ro1, ro2, ..., rom> of the $r^{th}$ layer of the neural network and neuron reference output values <rt1, rt2, ..., rtm> of the $r^{th}$ layer of the neural network, comparing the backpropagation update values <C1, C2, ..., Cm> of the $r^{th}$ layer of the neural network with a preset threshold, and when the backpropagation update values <C1, C2, ..., Cm> of the $r^{th}$ layer of the neural network are greater than the preset threshold, updating the filters in the RRAM based on the backpropagation update values <C1, C2, ..., Cm> of the $r^{th}$ layer of the neural network.

According to this solution, an update operation in neural network training is determined by setting the preset threshold, and the update operation is performed only when the update value is greater than the preset threshold. Because weights in the neural network training are updated insignificantly on the whole, this solution can greatly reduce write/erase operations brought to the RRAM by a large quantity of update operations in the neural network training such that service life of the RRAM is prolonged. In addition, due to fewer update operations, a possibility of more hard errors in the RRAM is reduced such that reliability of the RRAM is ensured.

With reference to the first aspect, in some implementations of the first aspect, the preset threshold is a static threshold or a dynamic threshold, and when the preset threshold is a static threshold, preset thresholds of all layers of the neural network are the same, or when the preset threshold is a dynamic threshold, preset thresholds of different layers of the neural network are different or partially different.

The static threshold in this implementation is provided as a fixed comparison threshold for the update operations of the neural network. In an embodiment, a backpropagation update value of each layer of the neural network is compared with the static threshold, and many write/erase operations performed when update values are below the static threshold are avoided, thereby prolonging the service life of the RRAM. The dynamic threshold in this implementation is used to provide different or partially different thresholds for the different layers of the neural network. Update sensitivities of different layers of networks in the neural network are different due to error propagation of the neural network, and in this case, the different or partially different thresholds are set for the different layers of the neural network layer. This can make update operations more purposeful, and further ensures the service life of the RRAM.

With reference to the first aspect, in some implementations of the first aspect, the method further includes performing an error test on the RRAM to output a hard error distribution map of the RRAM, and performing data rearrangement for the neural network based on the hard error distribution map of the RRAM.

Application of the RRAM is restricted by many natural features of a NVM, such as proneness to a relatively large quantity of hard errors, and the neural network is characterized by sparsity. Therefore, in this implementation, the hard error distribution map of the RRAM is obtained by performing the error test on the RRAM, and the data rearrangement is further performed for the neural network based on the hard error distribution map. This reduces impact of the hard errors in the RRAM on training precision of the neural network, or increases usage of the neural network on an RRAM having some undesirable cells.

With reference to the first aspect, in some implementations of the first aspect, the performing data rearrangement for the neural network based on the hard error distribution map of the RRAM includes arranging sparse data of the neural network into a stuck-at-0 hard error area on the RRAM.

Application of the RRAM is restricted by many natural features of a NVM, such as proneness to a relatively large quantity of hard errors, and the neural network is characterized by sparsity. Therefore, in this implementation, the sparse data of the neural network is arranged into the stuck-at-0 hard error area on the RRAM. This can effectively reduce impact of the hard errors in the RRAM on training precision of the neural network, or increase usage of the neural network on an RRAM having some undesirable cells.

With reference to the first aspect, in some implementations of the first aspect, the performing an error test on the RRAM to output a hard error distribution map of the RRAM includes writing a test value for each cell in the RRAM, and comparing the test value of each cell with an actually read value of each cell, to obtain a hard error status of each cell in the RRAM, where hard error statuses of the cells in the RRAM form the hard error distribution map of the RRAM.

With reference to the first aspect, in some implementations of the first aspect, when the preset threshold is a dynamic threshold, preset thresholds of different layers of the neural network are different or partially different, specifically, that preset thresholds of different layers of the neural network are different includes the preset thresholds decrease progressively layer by layer in reverse order of layers of the neural network, and that preset thresholds of different layers of the neural network are partially different includes preset thresholds of layers at the front of the neural network are less than preset thresholds of layers at the rear of the neural network, where the layers at the front of the neural network are layers close to an input layer of the neural network and are specifically a first layer to an $X^{th}$ layer, and the layers at the rear of the neural network are layers close to an output layer of the neural network and are specifically an $(R-X)^{th}$ layer to an $R^{th}$ layer, where R is a total quantity of layers of the neural network, and X is greater than 1 and less than R.

Update sensitivities of different layers of networks in the neural network are different due to error propagation of the neural network, and in this case, the different or partially different thresholds are set for the different layers of the neural network layer. This can make update operations more purposeful, and further ensures the service life of the RRAM.

According to a second aspect, a neural network training apparatus is provided, where the apparatus is applied to a RRAM, and the apparatus includes a forward calculation module configured to input neuron input values <ri1, ri2, ..., rin> of an $r^{th}$ layer of a neural network to the RRAM, and perform calculation for the neuron input values <ri1, ri2, ..., rin> based on filters in the RRAM, to obtain neuron output values <ro1, ro2, ..., rom> of the $r^{th}$ layer of the neural network, where n is a positive integer greater than 0, and m is a positive integer greater than 0, a backward calculation module configured to perform calculation based on kernel values of the RRAM, the neuron input values <ri1, ri2, ..., rin> of the $r^{th}$ layer of the neural network, the neuron output values <ro1, ro2, ..., rom> of the $r^{th}$ layer of the neural network, and backpropagation error values <B1, B2, ..., Bm> of the $r^{th}$ layer of the neural network, to obtain backpropagation update values <C1, C2, ..., Cm> of the $r^{th}$ layer of the neural network, where the kernel values of the RRAM are matrix values of the filters in the RRAM, and the backpropagation error values <B1, B2, ..., Bm> of the $r^{th}$ layer of the neural network are obtained based on the neuron output values <ro1, ro2, ..., rom> of the $r^{th}$ layer of the neural network and neuron reference output values <rt1, rt2, ..., rtm> of the $r^{th}$ layer of the neural network, a comparison module configured to compare the backpropagation update values <C1, C2, ..., Cm> of the $r^{th}$ layer of the neural network with a preset threshold, and an update module configured to, when the backpropagation update values <C1, C2, ..., Cm> of the $r^{th}$ layer of the neural network are greater than the preset threshold, update the filters in the RRAM based on the backpropagation update values <C1, C2, ..., Cm> of the $r^{th}$ layer of the neural network.

According to this solution, an update operation in neural network training is determined by setting the preset threshold, and the update operation is performed only when the update value is greater than the preset threshold. Because weights in the neural network training are updated insignificantly on the whole, this solution can greatly reduce write/erase operations brought to the RRAM by a large quantity of update operations in the neural network training such that service life of the RRAM is prolonged.

With reference to the second aspect, in some implementations of the second aspect, the apparatus further includes a threshold generation module configured to generate the preset threshold, where the preset threshold includes a static threshold or a dynamic threshold, specifically, the static threshold means that the threshold generation module sets preset thresholds of all layers of the neural network to be the same, and the dynamic threshold means that the threshold generation module sets preset thresholds of different layers of the neural network to be different or partially different.

The static threshold in this implementation is provided as a fixed comparison threshold for the update operations of the neural network. In an embodiment, a backpropagation update value of each layer of the neural network is compared with the static threshold, and many write/erase operations performed when update values are below the static threshold are avoided, thereby prolonging the service life of the RRAM. The dynamic threshold in this implementation is used to provide different or partially different thresholds for the different layers of the neural network. Update sensitivities of different layers of networks in the neural network are different due to error propagation of the neural network, and in this case, the different or partially different thresholds are set for the different layers of the neural network layer. This can make update operations more purposeful, and further ensures the service life of the RRAM.

With reference to the second aspect, in some implementations of the second aspect, the comparison module includes the preset threshold, the preset threshold is a static threshold, and specifically, the static threshold means that the processor sets preset thresholds of all layers of the neural network to be the same.

With reference to the second aspect, in some implementations of the second aspect, the apparatus further includes an error test module and a rearrangement module, the error test module is configured to perform an error test on the RRAM to output a hard error distribution map of the RRAM to the rearrangement module, and the rearrangement module is configured to perform data rearrangement for the neural network based on the hard error distribution map of the RRAM.

Application of the RRAM is restricted by many natural features of a NVM, such as proneness to a relatively large quantity of hard errors, and the neural network is characterized by sparsity. Therefore, in this implementation, the hard error distribution map of the RRAM is obtained by performing the error test on the RRAM, and the data rearrangement is further performed for the neural network based on the hard error distribution map. This reduces impact of the hard errors in the RRAM on training precision of the neural network, or increases usage of the neural network on an RRAM having some undesirable cells.

With reference to the second aspect, in some implementations of the second aspect, the rearrangement module is configured to arrange sparse data of the neural network into a stuck-at-0 hard error area on the RRAM.

Application of the RRAM is restricted by many natural features of a NVM, such as proneness to a relatively large quantity of hard errors, and the neural network is characterized by sparsity. Therefore, in this implementation, the sparse data of the neural network is arranged into the stuck-at-0 hard error area on the RRAM. This can effectively reduce impact of the hard errors in the RRAM on training precision of the neural network, or increase usage of the neural network on an RRAM having some undesirable cells.

With reference to the second aspect, in some implementations of the second aspect, the error test module is configured to write a test value for each cell in the RRAM and compare the test value of each cell with an actually read value of each cell, to obtain a hard error status of each cell in the RRAM, where hard error statuses of the cells in the RRAM form the hard error distribution map of the RRAM.

With reference to the second aspect, in some implementations of the second aspect, the threshold generation module sets preset thresholds of different layers of the neural network to be different or partially different includes the threshold generation module sets the preset thresholds to decrease progressively layer by layer in reverse order of layers of the neural network, or sets preset thresholds of layers at the front of the neural network to be less than preset thresholds of layers at the rear of the neural network, where the layers at the front of the neural network are layers close to an input layer of the neural network and are specifically a first layer to an $X^{th}$ layer, and the layers at the rear of the neural network are layers close to an output layer of the neural network and are specifically an $(R-X)^{th}$ layer to an $R^{th}$ layer, where R is a total quantity of layers of the neural network, and X is greater than 1 and less than R.

Update sensitivities of different layers of networks in the neural network are different due to error propagation of the neural network, and in this case, the different or partially different thresholds are set for the different layers of the neural network layer. This can make update operations more purposeful, and further ensures the service life of the RRAM.

According to a third aspect, a neural network training apparatus is provided, applied to a RRAM, and the apparatus includes a processor configured to input neuron input values <ri1, ri2, ..., rin> of an $r^{th}$ layer of a neural network to the RRAM, and perform calculation for the neuron input values <ri1, ri2, ..., rin> based on filters in the RRAM, to obtain neuron output values <ro1, ro2, ..., rom> of the $r^{th}$ layer of the neural network, where n is a positive integer greater than 0, and m is a positive integer greater than 0, and perform calculation based on kernel values of the RRAM, the neuron input values <ri1, ri2, ..., rin> of the $r^{th}$ layer of the neural network, the neuron output values <ro1, ro2, ..., rom> of the $r^{th}$ layer of the neural network, and backpropagation error values <B1, B2, ..., Bm> of the $r^{th}$ layer of the neural network, to obtain backpropagation update values <C1, C2, ..., Cm> of the $r^{th}$ layer of the neural network, where the kernel values of the RRAM are matrix values of the filters in the RRAM, and the backpropagation error values <B1, B2, ..., Bm> of the $r^{th}$ layer of the neural network are obtained based on the neuron output values <ro1, ro2, ..., rom> of the $r^{th}$ layer of the neural network and neuron reference output values <rt1, rt2, ..., rtm> of the $r^{th}$ layer of the neural network, and a comparator configured to compare the backpropagation update values <C1, C2, ..., Cm> of the $r^{th}$ layer of the neural network with a preset threshold, and when the backpropagation update values <C1, C2, ..., Cm> of the $r^{th}$ layer of the neural network are greater than the preset threshold, the processor updates the filters in the RRAM based on the backpropagation update values <C1, C2, ..., Cm> of the $r^{th}$ layer of the neural network.

According to this solution, an update operation in neural network training is determined by setting the preset threshold, and the update operation is performed only when the update value is greater than the preset threshold. Because weights in the neural network training are updated insignificantly on the whole, this solution can greatly reduce write/erase operations brought to the RRAM by a large quantity of update operations in the neural network training such that service life of the RRAM is prolonged.

With reference to the third aspect, in some implementations of the third aspect, the processor is further configured to generate the preset threshold, where the preset threshold includes a static threshold or a dynamic threshold, specifically, the static threshold means that the processor sets preset thresholds of all layers of the neural network to be the same, and the dynamic threshold means that the processor sets preset thresholds of different layers of the neural network to be different or partially different.

The static threshold in this implementation is provided as a fixed comparison threshold for the update operations of the neural network. In an embodiment, a backpropagation update value of each layer of the neural network is compared with the static threshold, and many write/erase operations performed when update values are below the static threshold are avoided, thereby prolonging the service life of the RRAM. The dynamic threshold in this implementation is used to provide different or partially different thresholds for the different layers of the neural network. Update sensitivities of different layers of networks in the neural network are different due to error propagation of the neural network, and in this case, the different or partially different thresholds are set for the different layers of the neural network layer. This can make update operations more purposeful, and further ensures the service life of the RRAM.

With reference to the third aspect, in some implementations of the third aspect, the comparator includes the preset threshold, the preset threshold is a static threshold, and specifically, the static threshold means that the processor sets preset thresholds of all layers of the neural network to be the same.

With reference to the third aspect, in some implementations of the third aspect, the processor is further configured to receive a hard error distribution map of the RRAM, and perform data rearrangement for the neural network based on the hard error distribution map of the RRAM, where the hard error distribution map is obtained by performing an error test on the RRAM by a peripheral circuit of the processor.

Application of the RRAM is restricted by many natural features of a NVM, such as proneness to a relatively large quantity of hard errors, and the neural network is characterized by sparsity. Therefore, in this implementation, the hard error distribution map of the RRAM is obtained by performing the error test on the RRAM, and the data rearrangement is further performed for the neural network based on the hard error distribution map. This reduces impact of the hard errors in the RRAM on training precision of the neural network, or increases usage of the neural network on an RRAM having some undesirable cells.

With reference to the third aspect, in some implementations of the third aspect, the processor is configured to arrange sparse data of the neural network into a stuck-at-0 hard error area on the RRAM based on the hard error distribution map of the RRAM.

Application of the RRAM is restricted by many natural features of a NVM, such as proneness to a relatively large quantity of hard errors, and the neural network is characterized by sparsity. Therefore, in this implementation, the sparse data of the neural network is arranged into the stuck-at-0 hard error area on the RRAM. This can effectively reduce impact of the hard errors in the RRAM on training precision of the neural network, or increase usage of the neural network on an RRAM having some undesirable cells.

With reference to the third aspect, in some implementations of the third aspect, the hard error distribution map of the RRAM that is received by the processor is obtained using an error test circuit. The error test circuit is configured to write a test value for each cell in the RRAM, and compare the test value of each cell with an actually read value of each cell, to obtain a hard error status of each cell in the RRAM, where hard error statuses of the cells in the RRAM form the hard error distribution map of the RRAM. The error test circuit exists independently of the processor, and is electrically connected to the processor.

With reference to the third aspect, in some implementations of the third aspect, the processor sets preset thresholds of different layers of the neural network to be different or partially different specifically includes the processor sets the preset thresholds to decrease progressively layer by layer in reverse order of layers of the neural network, or sets preset thresholds of layers at the front of the neural network to be less than preset thresholds of layers at the rear of the neural network, where the layers at the front of the neural network are layers close to an input layer of the neural network and are a first layer to an $X^{th}$ layer, and the layers at the rear of the neural network are layers close to an output layer of the neural network and are specifically an $(R-X)^{th}$ layer to an $R^{th}$ layer, where R is a total quantity of layers of the neural network, and X is greater than 1 and less than R.

Update sensitivities of different layers of networks in the neural network are different due to error propagation of the neural network, and in this case, the different or partially different thresholds are set for the different layers of the neural network layer. This can make update operations more purposeful, and further ensures the service life of the RRAM.

According to a fourth aspect, a computer-readable storage medium is provided, including an instruction, where when the instruction runs on a server or a terminal, the server or the terminal performs the neural network training method according to the first aspect.

BRIEF DESCRIPTION OF DRAWINGS

FIG. 3 is a flowchart of a neural network training method according to an embodiment of this application.

DESCRIPTION OF EMBODIMENTS

For ease of understanding, related descriptions of a neural network and an RRAM are first provided.

A neural network, also referred to as a connection model, is an algorithm mathematical model simulating behavioral characteristics of an animal neural network to perform distributed parallel information processing. Such a type of network relies on the degree of system complexity and adjusts interconnection relationships between a large quantity of internal nodes, thereby processing information.

A writable and erasable memory technology capable of significantly improving endurance and a data transmission speed is used for an RRAM. The RRAM is a memory storing a variety of information by virtue of a property that resistance of a material varies between a high-impedance state and a low-impedance state accordingly with different voltages applied to a metal oxide, to make a current flow path closed or blocked.

Figure 1:
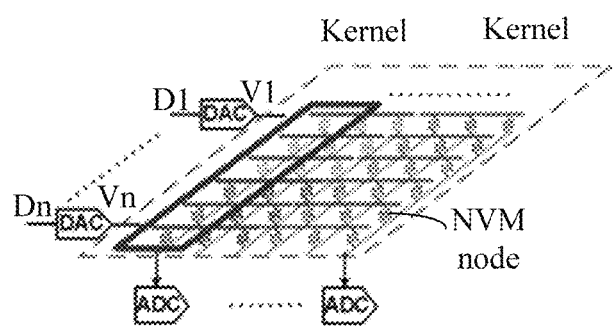
FIG. 1 is a structural diagram of a crossbar array of an RRAM cell.

An emerging RRAM device is considered as one of devices improving computation energy efficiency of the neural network. First, the RRAM is a NVM and has relatively high integration density. Compared with a flash memory device, the RRAM is more suitable for data access close to a processor attributing to a higher access speed and lower power consumption, and therefore is a non-volatile data storage medium that is quite suitable for application in a device such as a mobile terminal. Second, different from a conventional memory cell that has two values 0 and 1, an RRAM memory cell can represent a plurality of values by virtue of a resistance variable feature. Based on the foregoing features of the RRAM, a crossbar array structure is built using the RRAM. As shown in FIG. 1, a crossbar array structure using an RRAM cell quite adapts to a matrix vector multiplication operation of the neural network.

The crossbar array structure is a structure with crossed rows and columns. As shown in FIG. 1, an NVM is disposed on each intersection node (the intersection node is referred to as an NVM node below) for data storage and computing. Because computing at a neural network layer is mainly vector-matrix multiplication or matrix-matrix multiplication, a crossbar array is quite suitable for neural network computing. Specifically, as shown in FIG. 1, it is assumed that a to-be-calculated vector has n dimensions, and n elements in the to-be-calculated vector are represented by digital signals D1 to Dn, respectively. Then, a DAC is used to convert the digital signals D1 to Dn into analog signals V1 to Vn. In this case, the n elements in the to-be-calculated vector are represented by the analog signals V1 to Vn, respectively. Next, the analog signals V1 to Vn are input to n rows of the crossbar array, respectively. A conductance value of an NVM node in each column of the crossbar array represents a size of a weight stored in the NVM node. Therefore, after the analog signals V1 to Vn are applied to NVM nodes corresponding to each column, a current value that is output by each NVM node represents a product of a weight stored in the NVM node and a data element represented by an analog signal received by the NVM node. Because each column of the crossbar array corresponds to a kernel vector, a sum of output currents in each column represents an operation result of a product of a kernel value corresponding to the column and a submatrix corresponding to the to-be-calculated vector. Afterwards, as shown in FIG. 1, an ADC at the end of each column of the crossbar array is used to convert the operation result of the product from an analog parameter into a digital parameter, and output the digital parameter. It can be learned from the foregoing working principle that, the crossbar array converts matrix-matrix multiplication into a multiplication operation of two vectors (the to-be-calculated vector and a kernel vector), and can quickly obtain a calculation result based on analog calculation, therefore the crossbar array is quite suitable for processing an operation such as vector-matrix multiplication or matrix-matrix multiplication. Because more than 90% of the operations in the neural network belong to this type of operation, the crossbar array is suitable to serve as a calculation unit in the neural network.

Figure 2:
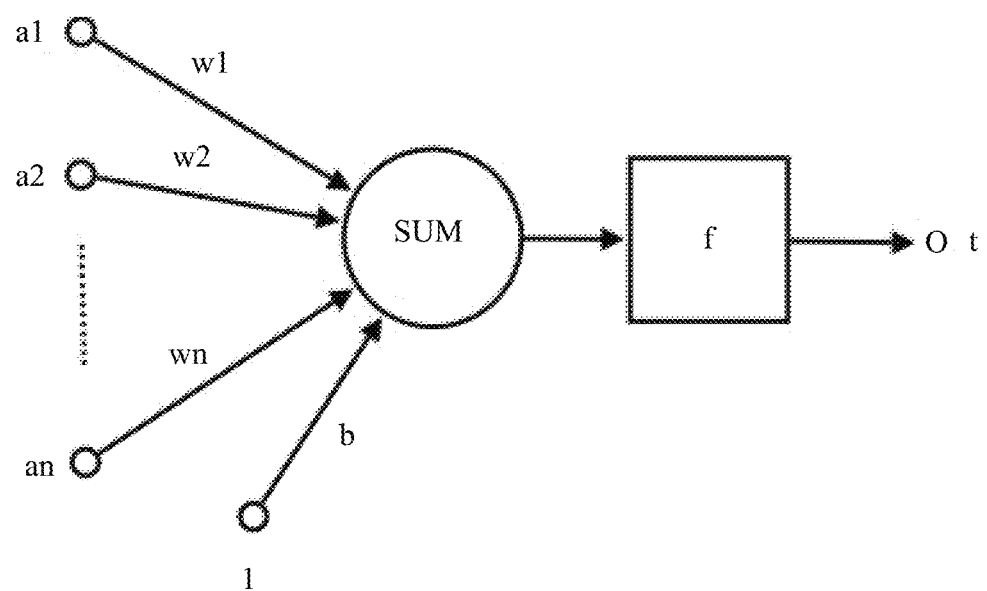
FIG. 2 is a diagram of a working principle of a neuron.

Further, FIG. 2 shows information transfer from inputs of neurons a1, a2, . . . , an to an exit t. A transfer manner is a signal strength generated by each neuron is aggregated and transferred towards the exit based on a transfer potency of a synapse. This may be represented mathematically as a multiply-accumulate operation performed between a vector <a1, a2, . . . , an> and a weight vector <w1, w2, . . . , wn> of the synapse. The vector <a1, a2, . . . , an> herein is equivalent to the to-be-calculated vector mentioned above, and the transfer potency of the synapse herein, namely, the weight vector <w1, w2, . . . , wn> of the synapse is equivalent to the kernel vector mentioned above. In conclusion, such a multiply-accumulate operation is implemented relatively easily using the crossbar array in FIG. 1. In an embodiment, the neuron strengths <a1, . . . , an> are input into DACs on the left side, kernels are stored in the crossbar array, and the first column is <w1, . . . , wn> vertically such that a SUM (multiply-accumulate) result is output on ADCs. b represents a bias that is used to increase or decrease a neuron input by a fixed value.

However, application of the RRAM is restricted by a lifetime of the RRAM. Similar to a flash device, a lifetime of a single cell in the RRAM is restricted by a write/erase count. When impedance of a single cell changes for a particular quantity of times, an impedance changing ability becomes weak, affecting the lifetime and causing an error. In addition, frequent update operations also greatly increase a possibility of a potential hard error, affecting reliability of the RRAM.

In existing work, an RRAM crossbar array is used only for forward calculation of the neural network in most cases. In an embodiment, neural network parameters that have been trained on another device, including strengths (weights) of neurons and synapses, are loaded into the RRAM crossbar array. In this method, application of the neural network in an inference process is increased mainly by virtue of features of low power consumption, a combination of computing and storage, and high-speed matrix multiplication of the RRAM. If the features of low power consumption, the combination of computing and storage, and high-speed matrix multiplication of the RRAM are further applied to a neural network training process, an operation process and result are affected by the foregoing soft error and hard error. This is caused by a difference between the training process and the inference process. The inference process includes only forward calculation, including a large quantity of matrix multiplication. The training process includes forward calculation, backpropagation, and parameter updating. The forward calculation and backpropagation include a large quantity of matrix multiplication, and for the parameter updating, the strengths of the neurons and synapses need to be updated based on a result of the backpropagation. In the training process, it may be considered that massive synapses and neuron strength training are performed for a training set, usually a training set of a large data volume. Therefore, a large quantity of update operations are performed in this process. Frequent write operations brought by the update operations greatly affect reliability of the RRAM cell, and increase a possibility of a potential soft error and hard error.

To resolve the foregoing problem, with reference to FIG. 3, the following details a neural network training method according to an embodiment of this application. The method is applied to a RRAM. Specifically, the method is applied to a crossbar array structure of the RRAM.

FIG. 3 is a flowchart of a neural network training method according to an embodiment of this application. The method includes the following steps.

301. Input neuron input values <ri1, ri2, . . . , rin> of an $r^{th}$ layer of a neural network to the RRAM, and perform calculation for the neuron input values <ri1, ri2, . . . , rin> based on filters (filter) in the RRAM, to obtain neuron output values <ro1, ro2, . . . , rom> of the $r^{th}$ layer of the neural network, where n is a positive integer greater than 0, and m is a positive integer greater than 0.

Each node in the RRAM crossbar array is considered a cell. The cell is used for data storage and computing, and inputs the neuron input values <ri1, ri2, . . . , rin> of the $r^{th}$ layer of the neural network to the RRAM. The performing calculation for the neuron input values <ri1, ri2, . . . , rin> based on filters (filter) in the RRAM may be performing, by a neural network accelerator formed by the RRAM, calculation for the neuron input values <ri1, ri2, . . . , rin>. Specifically, the neural network accelerator includes a plurality of filters, these filters form a group of filters, and the group of filters are presented as a matrix. Each column of the matrix is represented by a filter, which is also referred to as a kernel vector. Therefore, the performing the calculation for the neuron input values based on filters in the RRAM is performing a multiply-accumulate operation on a neuron input value vector and the kernel vector, and converting, by an ADC in the RRAM, a result obtained through the multiply-accumulate operation, to obtain the neuron output values <ro1, ro2, . . . , rom> of the $r^{th}$ layer of the neural network.

It should be noted that the crossbar array is one type of RRAM. There are a wide variety of RRAMs. In recent years, the crossbar array is a relatively common implementation carrier of the neural network accelerator. The crossbar array is used as the neural network accelerator based on an RRAM feature, namely, an impedance-based storage manner, of the crossbar array.

303. Perform calculation based on kernel values of the RRAM, the neuron input values <ri1, ri2, . . . , rin> of the $r^{th}$ layer of the neural network, the neuron output values <ro1, ro2, . . . , rom> of the $r^{th}$ layer of the neural network, and backpropagation error values <B1, B2, . . . , Bm> of the $r^{th}$ layer of the neural network, to obtain backpropagation update values <C1, C2, . . . , Cm> of the $r^{th}$ layer of the neural network, where the kernel values of the RRAM are matrix values of the filters in the RRAM, and the backpropagation error values <B1, B2, . . . , Bm> of the $r^{th}$ layer of the neural network are obtained based on the neuron output values <ro1, ro2, . . . , rom> of the $r^{th}$ layer of the neural network and neuron reference output values <rt1, rt2, . . . , rtm> of the $r^{th}$ layer of the neural network.

As shown in step b in FIG. 3, for the $r^{th}$ layer of the neural network, a multiplication operation is performed on the neuron input values <ri1, ri2, . . . , rin> and the kernel values (represented as <W1, W2, . . . , Wn> in FIG. 4) of the RRAM and is performed on the neuron output values <ro1, ro2, . . . , rom> and the backpropagation error values <B1, B2, . . . , Bm>, to obtain the backpropagation update values <C1, C2, . . . , Cm> of the layer. It should be noted that, a quantity of the neuron input values and a quantity of the neuron output values are unnecessarily the same, and therefore are denoted by n and m, respectively. Both n and m are positive integers greater than 0, and n may be equal to m, but in more cases, n and m are not the same.

305. Compare the backpropagation update values <C1, C2, . . . , Cm> of the $r^{th}$ layer of the neural network with a preset threshold.

307. When the backpropagation update values <C1, C2, . . . , Cm> of the $r^{th}$ layer of the neural network are greater than the preset threshold, update the filters in the RRAM based on the backpropagation update values <C1, C2, . . . , Cm> of the $r^{th}$ layer of the neural network.

According to this solution, an update operation in neural network training is determined by setting the preset threshold, and the update operation is performed only when the update value is greater than the preset threshold. Because weights in the neural network training are updated insignificantly on the whole, this solution can greatly reduce write/erase operations brought to the RRAM by a large quantity of update operations in the neural network training such that service life of the RRAM is prolonged. In addition, due to fewer update operations, a possibility of more hard errors in the RRAM is reduced such that reliability of the RRAM is ensured.

Optionally, in some embodiments, the preset threshold is a static threshold or a dynamic threshold, and when the preset threshold is a static threshold, preset thresholds of all layers of the neural network are the same, or when the preset threshold is a dynamic threshold, preset thresholds of different layers of the neural network are different or partially different.

When a static threshold is being used, a relatively small general threshold, for example, 0.01, is directly used. When the update value does not exceed 0.01, an update is ignored. When a dynamic threshold is being used, there are two cases. In one case, different thresholds are used for different layers of the neural network. In the other case, one threshold is used for some layers in the neural network, and another threshold is used for the other layers. Certainly, the other layers herein may also be several other layers. In this way, the different layers of the neural network are divided into different parts, and thresholds corresponding to the parts are different from each other. This is out of consideration for different update sensitivities of the layers due to error propagation in the neural network.

The static threshold in this implementation is provided as a fixed comparison threshold for the update operations of the neural network. In an embodiment, a backpropagation update value of each layer of the neural network is compared with the static threshold, and many write/erase operations performed when update values are below the static threshold are avoided, thereby prolonging the service life of the RRAM. The dynamic threshold in this implementation is used to provide different or partially different thresholds for the different layers of the neural network. Update sensitivities of different layers of networks in the neural network are different due to error propagation of the neural network, and in this case, the different or partially different thresholds are set for the different layers of the neural network layer. This can make update operations more purposeful, and further ensures the service life of the RRAM.

Specifically, in some embodiments, when the preset threshold is a dynamic threshold, preset thresholds of different layers of the neural network are different or partially different. Specifically, that preset thresholds of different layers of the neural network are different includes the preset thresholds decrease progressively layer by layer in reverse order of layers of the neural network, and that preset thresholds of different layers of the neural network are partially different includes preset thresholds of layers at the front of the neural network are less than preset thresholds of layers at the rear of the neural network, where the layers at the front of the neural network are layers close to an input layer of the neural network and are a first layer to an $X^{th}$ layer, and the layers at the rear of the neural network are layers close to an output layer of the neural network and are an $(R-X)^{th}$ layer to an $R^{th}$ layer, where R is a total quantity of layers of the neural network, and X is greater than 1 and less than R.

Because the error propagation of the neural network rapidly decreases from rear to front, the layers close to the input layer of the neural network are more sensitive to an update, and relatively small preset thresholds may be used for the layers. The layers close to the output layer of the neural network are less sensitive to an update, and relatively large preset thresholds may be used for the layers.

In conclusion, update sensitivities of different layers of networks in the neural network are different due to error propagation of the neural network, and in this case, different or partially different thresholds are set for the different layers of the neural network layer. This can make update operations more purposeful, and further ensures the service life of the RRAM.

Optionally, in some embodiments, the method further includes performing an error test on the RRAM to output a hard error distribution map of the RRAM, and performing data rearrangement for the neural network based on the hard error distribution map of the RRAM.

Application of the RRAM is restricted by many natural features of a NVM, such as proneness to a relatively large quantity of hard errors, and the neural network is characterized by sparsity. Therefore, in this implementation, the hard error distribution map of the RRAM is obtained by performing the error test on the RRAM, and the data rearrangement is further performed for the neural network based on the hard error distribution map. This reduces impact of the hard errors in the RRAM on training precision of the neural network, or increases usage of the neural network on an RRAM having some undesirable cells.

Optionally, in some embodiments, the performing data rearrangement for the neural network based on the hard error distribution map of the RRAM includes arranging sparse data of the neural network into a stuck-at-0 hard error area on the RRAM.

Application of the RRAM is restricted by many natural features of a NVM, such as proneness to a relatively large quantity of hard errors, and the neural network is characterized by sparsity. Therefore, in this implementation, the sparse data of the neural network is arranged into the stuck-at-0 hard error area on the RRAM. This can effectively reduce impact of the hard errors in the RRAM on training precision of the neural network, or increase usage of the neural network on an RRAM having some undesirable cells.

It should be noted that the error test does not need to be performed in each time of iteration of the neural network. The error test may be performed before the neural network training, and the hard error distribution map of the RRAM is output in this embodiment of the present disclosure such that rearrangement is performed for the neural network based on the hard error distribution map in this embodiment of the present disclosure. Alternatively, the error test may be performed after a particular quantity of iterations, because the hard errors of the RRAM may occur constantly in the neural network training. After a period of training, a phased error test is performed on the RRAM, a corresponding hard error distribution map of the RRAM is output, and then data arrangement is performed for the neural network based on the hard error distribution map of the RRAM. This helps fully utilize a stuck-at-0 hard error cell in the RRAM, and allocate the sparse data of the neural network to the stuck-at-0 error area as much as possible, thereby increasing usage of the neural network in the RRAM.

Optionally, in some embodiments, the performing an error test on the RRAM to output a hard error distribution map of the RRAM includes writing a test value for each cell in the RRAM, and comparing the test value of each cell with an actually read value of each cell, to obtain a hard error status of each cell in the RRAM, where hard error statuses of the cells in the RRAM form the hard error distribution map of the RRAM.

The following describes an apparatus embodiment of this application. The apparatus embodiment corresponds to the method embodiment. Therefore, for parts that are not detailed, refer to the foregoing method embodiments. Likewise, for content that is not detailed in the method embodiments, refer to the description of the apparatus embodiment. Details are not described again.

Figure 4:
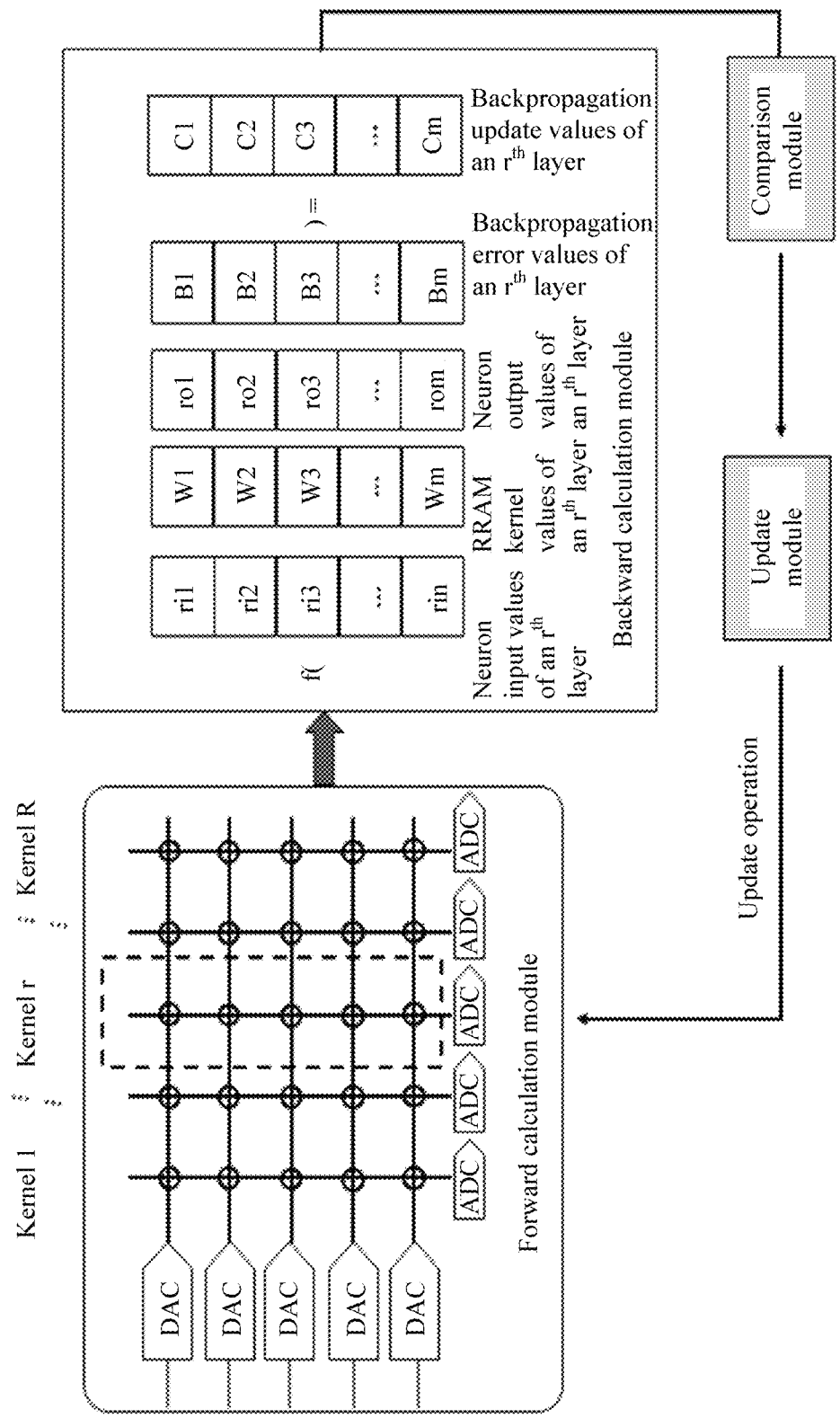
FIG. 4 is a schematic structural diagram of a neural network training apparatus according to an embodiment of this application.

FIG. 4 is a schematic structural diagram of a neural network training apparatus according to an embodiment of this application. The neural network training apparatus is applied to a RRAM, and the apparatus includes a forward calculation module configured to input neuron input values <ri1, ri2, . . . , rin> of an $r^{th}$ layer of a neural network to the RRAM, and perform calculation for the neuron input values <ri1, ri2, . . . , rin> based on filters in the RRAM, to obtain neuron output values <ro1, ro2, . . . , rom> of the $r^{th}$ layer of the neural network, where n is a positive integer greater than 0, and m is a positive integer greater than 0, a backward calculation module configured to perform calculation based on kernel values of the RRAM, the neuron input values <ri1, ri2, . . . , rin> of the $r^{th}$ layer of the neural network, the neuron output values <ro1, ro2, . . . , rom> of the $r^{th}$ layer of the neural network, and backpropagation error values <B1, B2, . . . , Bm> of the $r^{th}$ layer of the neural network, to obtain backpropagation update values <C1, C2, . . . , Cm> of the $r^{th}$ layer of the neural network, where the kernel values of the RRAM are matrix values of the filters in the RRAM, and the backpropagation error values <B1, B2, . . . , Bm> of the $r^{th}$ layer of the neural network are obtained based on the neuron output values <ro1, ro2, . . . , rom> of the $r^{th}$ layer of the neural network and neuron reference output values <rt1, rt2, . . . , rtm> of the $r^{th}$ layer of the neural network, a comparison module configured to compare the backpropagation update values <C1, C2, . . . , Cm> of the $r^{th}$ layer of the neural network with a preset threshold, and an update module configured to, when the backpropagation update values <C1, C2, . . . , Cm> of the $r^{th}$ layer of the neural network are greater than the preset threshold, update the filters in the RRAM based on the backpropagation update values <C1, C2, . . . , Cm> of the $r^{th}$ layer of the neural network.

It should be noted that, the comparison module herein may be used as a part of the RRAM, or may be disposed independently of the RRAM. This is not limited herein.

According to this solution, an update operation in neural network training is determined by setting the preset threshold, and the update operation is performed only when the update value is greater than the preset threshold. Because weights in the neural network training are updated insignificantly on the whole, this solution can greatly reduce write/erase operations brought to the RRAM by a large quantity of update operations in the neural network training such that service life of the RRAM is prolonged. In addition, due to fewer update operations, a possibility of more hard errors in the RRAM is reduced such that reliability of the RRAM is ensured.

Optionally, in some embodiments, the apparatus further includes a threshold generation module configured to generate the preset threshold, where the preset threshold includes a static threshold or a dynamic threshold, specifically, the static threshold means that the threshold generation module sets preset thresholds of all layers of the neural network to be the same, and the dynamic threshold means that the threshold generation module sets preset thresholds of different layers of the neural network to be different or partially different.

Optionally, in some embodiments, the comparison module includes the preset threshold, the preset threshold is a static threshold, and the static threshold means that the processor sets preset thresholds of all layers of the neural network to be the same.

Optionally, in some embodiments, that the threshold generation module sets preset thresholds of different layers of the neural network to be different or partially different specifically includes the threshold generation module sets the preset thresholds to decrease progressively layer by layer in reverse order of layers of the neural network, or sets preset thresholds of layers at the front of the neural network to be less than preset thresholds of layers at the rear of the neural network, where the layers at the front of the neural network are layers close to an input layer of the neural network and are a first layer to an $X^{th}$ layer, and the layers at the rear of the neural network are layers close to an output layer of the neural network and are an $(R-X)^{th}$ layer to an $R^{th}$ layer, where R is a total quantity of layers of the neural network, and X is greater than 1 and less than R.

Figure 5:
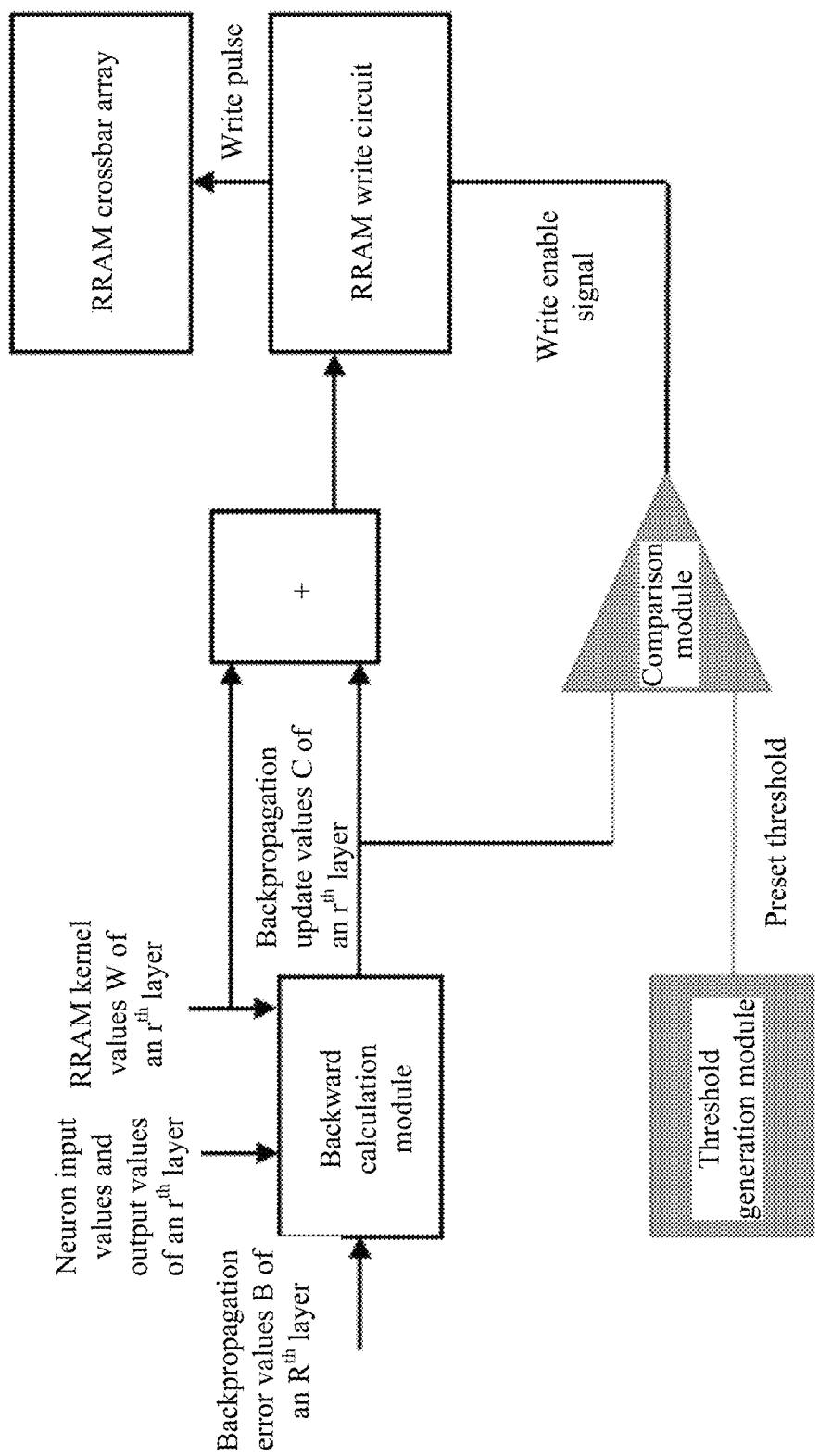
FIG. 5 is a schematic diagram of update logic according to an embodiment of this application.

FIG. 5 embodies update logic in this embodiment of the present disclosure. In an embodiment, the backpropagation update values <C1, C2, . . . , Cm> (a vector is represented by C in the figure) are calculated using the backward calculation module, and the backpropagation update values C enter the comparison module to be compared with the preset threshold of the threshold generation module. When the backpropagation update values are less than the preset threshold, a write enable signal is set to 0, and the backpropagation update values are not written to an RRAM crossbar array. When the backpropagation update values are greater than the preset threshold, a write enable signal is set to 1, and the backpropagation update values are written to an RRAM crossbar array. Based on this logic, some excessively small backpropagation update values are not updated to the RRAM array immediately, and only backpropagation update values significant enough are to be updated. Therefore, approximate neural network training is obtained. In a next iteration process, larger backpropagation error values <B1, B2, . . . , Bm> (a vector is represented by B in the figure) are generated in the approximate neural network training, compared with a non-approximate neural network. The larger backpropagation error value B tends to result in a larger backpropagation update value C in a backward calculation process. When the backpropagation update value C exceeds the preset threshold, the value may be updated to the RRAM crossbar array in a next iteration. In this way, it may be considered that backpropagation update values are accumulated for a plurality of times using such an approximation method. Further, such an accumulative manner is implemented through a main channel for a training process of the neural network. In this embodiment of the present disclosure, a special unit (such as the update logic shown in FIG. 5) is added during updating, to prevent some updates, without affecting other processes in the entire neural network training.

In this embodiment of the present disclosure, in addition to the static threshold, the different or partially different thresholds may be set for the different network layers of the neural network, and the thresholds are referred to as the dynamic threshold above. Error propagation of the neural network rapidly decreases from rear to front, and this is equivalent to differentiation on errors layer by layer in a backpropagation process. Therefore, the backpropagation update value becomes extremely small after backpropagation is performed on a particular quantity of layers. The layers close to the input layer of the neural network are more sensitive to an update, and relatively small preset thresholds may be correspondingly used for the layers. The layers close to the output layer of the neural network are less sensitive to an update, and relatively large preset thresholds are correspondingly used for the layers. In this way, the different or partially different thresholds are set for the different layers of the neural network layer. This can make update operations more purposeful, and further ensures the service life of the RRAM.

Optionally, in some embodiments, the apparatus further includes an error test module and a rearrangement module, the error test module is configured to perform an error test on the RRAM to output a hard error distribution map of the RRAM to the rearrangement module, and the rearrangement module is configured to perform data rearrangement for the neural network based on the hard error distribution map of the RRAM.

Optionally, in some embodiments, the rearrangement module is specifically configured to arrange sparse data of the neural network into a stuck-at-0 hard error area on the RRAM.

Figure 6:
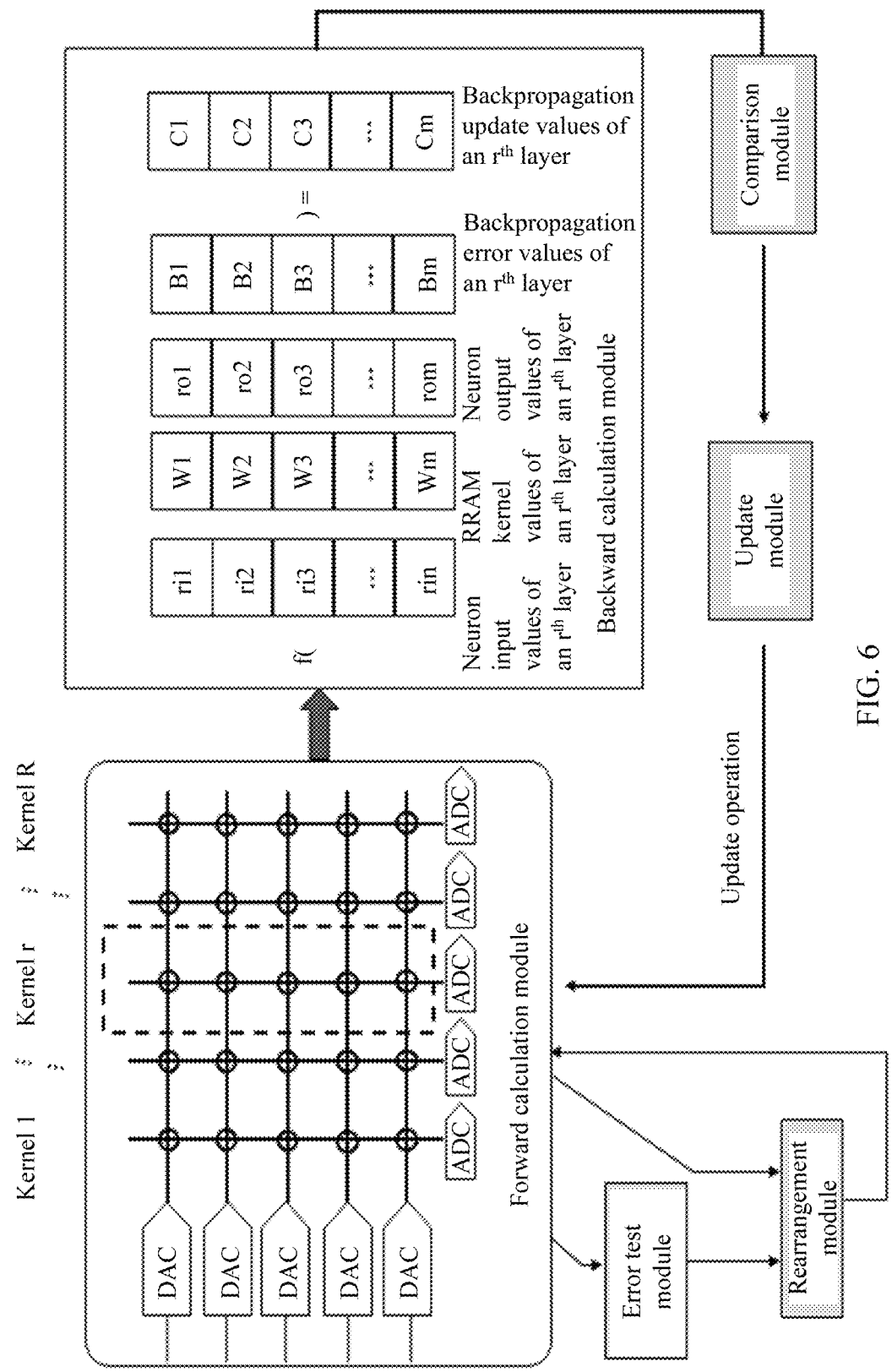
FIG. 6 is a schematic structural diagram of a neural network training apparatus according to another embodiment of this application.

As shown in FIG. 6, after the forward calculation module, the backward calculation module, the comparison module, and the update module complete one or more iterations of neural network training, the error test module may perform an error test on the RRAM, and the rearrangement module performs rearrangement for the neural network based on a hard error distribution map of the RRAM that is output through a test. It should be noted that the error test module and the rearrangement module do not necessarily perform and do not need to perform the error test and rearrangement each time of iteration of the neural network. The error test may be performed before the neural network training, that is, performed in advance when an entire training process (or a specific operation) has not been loaded into the crossbar array, or may be performed after a particular quantity of iterations, because the hard errors of the RRAM may occur constantly in the neural network training. After a period of training, a phased error test is performed on the RRAM, a corresponding hard error distribution map of the RRAM is output, and then the rearrangement module performs data rearrangement for the neural network based on the hard error distribution map of the RRAM. This helps fully utilize a stuck-at-0 hard error cell in the RRAM, and allocate the sparse data of the neural network to the stuck-at-0 error area as much as possible, thereby increasing usage of the neural network in the RRAM.

Figure 7:
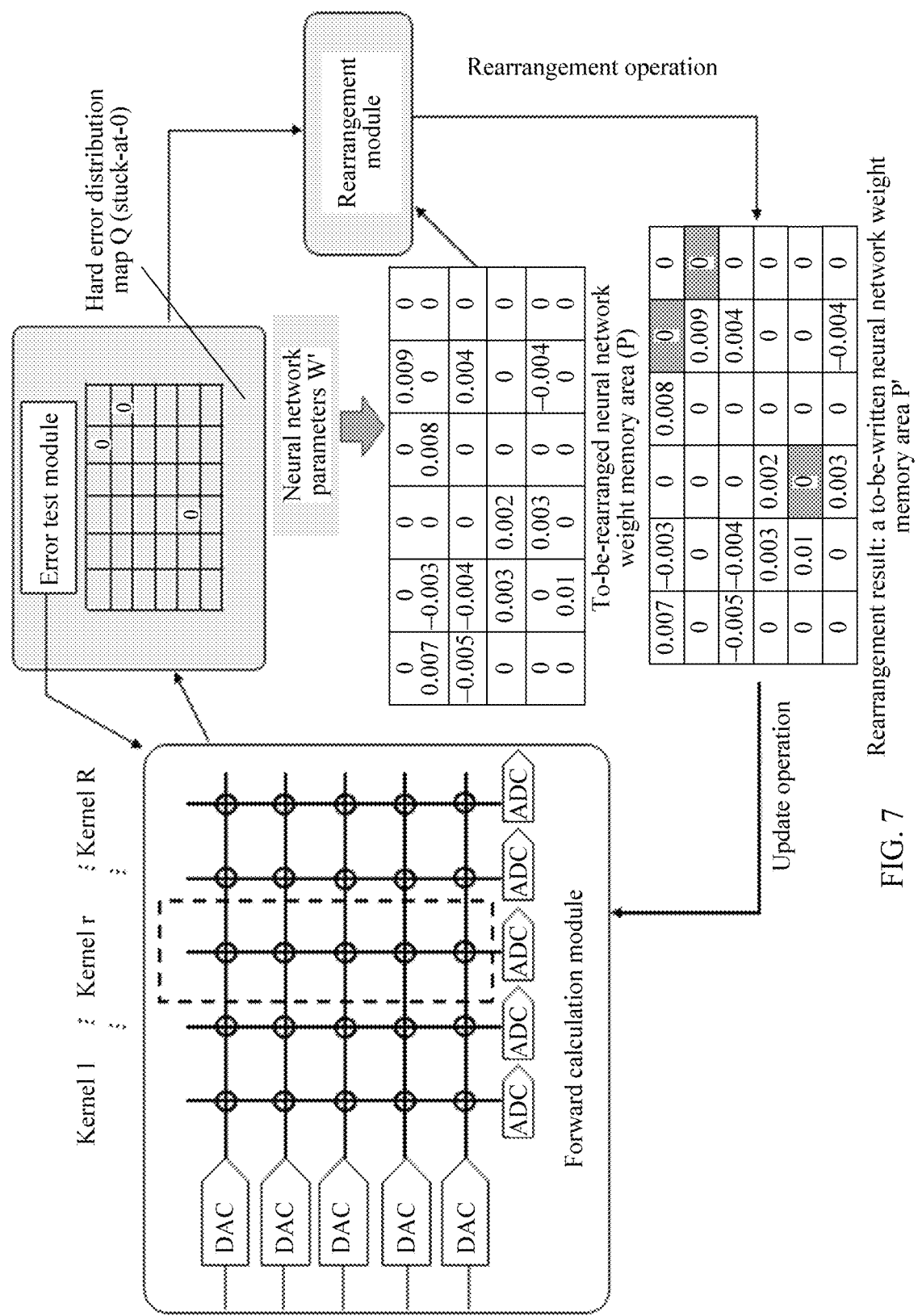
FIG. 7 is a schematic structural diagram of a neural network training apparatus according to still another embodiment of this application.

Specifically, as shown in FIG. 7, the rearrangement module receives an input of neural network parameters W' obtained upon completion or partial completion of an iteration of the neural network (the neural network parameters W' are specifically output by the update module in FIG. 4, W' is a result obtained by updating a vector W using a vector C, and a plurality of columns of vectors W' form a matrix P). Details are shown in a to-be-rearranged neural network weight memory area (assumed to be P) in FIG. 7. Another input is the hard error distribution map (assumed to be Q) of the RRAM. A main function of the module is to match the weight matrix P and the error distribution matrix Q. A part that is 0 (or approximately close to 0) in P is optimally switched to a stuck-at-0 part in Q at a granularity of a row of P. A rearrangement result is shown in a to-be-written neural network weight memory area (assumed to be P'). V is obtained from P through row switching in the present disclosure.

For switching, FIG. 7 provides a switching example. As shown in the error test module in FIG. 7, assuming that the RRAM is a 6×6 crossbar array, Q is a 6×6 matrix. After the error test module completes the error test on the RRAM, three stuck-at-0 error cells are obtained in Q an element in a fifth column and a first row, an element in a sixth column and a second row, and an element in a third column and a fifth row, respectively.

As shown in the rearrangement module in FIG. 7, P is an example weight matrix before rearrangement (namely, weight data of the neural network, including updated neural network weights W'). A cell that is 0 is actually a value approximately close to 0, and compared with another value such as 0.003, the value is a higher-order small value and is represented by 0 in the figure. It can be learned that approximately ⅔ of the values in P are 0. If P is directly written to the RRAM, elements that are not 0 in P, such as 0.009 in the fifth column and the first row and 0.003 in the third column and the fifth row, fall into stuck-at-0 error cells in Q.

As shown in the rearrangement module in FIG. 7, in a rearrangement process, the rearrangement module switches the first row with the second row and switches the fifth row with the sixth row in P based on distribution of stuck-at-0 cells in Q, to obtain the updated P'. Locations in V corresponding to three stuck-at-0 cells (1, 5), (2, 6), and (4, 3) (note in a format of row and column) in Q are all corresponding to the value 0, without affecting subsequent calculation.

In this embodiment of the present disclosure, a software method may be specifically used to implement rearrangement logic. Specific execution may be completed using a general purpose processor. The hard error distribution map Q obtained by the error test module may be written to a dedicated area of a peripheral circuit of the RRAM, and sent to the general purpose processor together with the updated weight area of the neural network for rearrangement.

In the rearrangement module, the rearrangement logic is implemented based on sparsity of the neural network. Most data is approximately close to 0. In the neural network characterized by sparsity, a result of matching a stuck-at-0 cell can be obtained relatively easily.

In addition, it should be noted that, hard errors of the RRAM include a stuck-at-0 hard error and a stuck-at-1 hard error, and stuck-at-1 errors are far fewer than stuck-at-0 errors. Therefore, in this embodiment of the present disclosure, the stuck-at-0 hard error is a focus of attention. The stuck-at-1 error may be processed by skipping an entire row, or may be processed in another manner. This is not limited in this embodiment of the present disclosure.

Optionally, in some embodiments, the error test module is specifically configured to write a test value for each cell in the RRAM, and compare the test value of each cell with an actually read value of each cell, to obtain a hard error status of each cell in the RRAM, where hard error statuses of the cells in the RRAM form the hard error distribution map of the RRAM.

Figure 8:
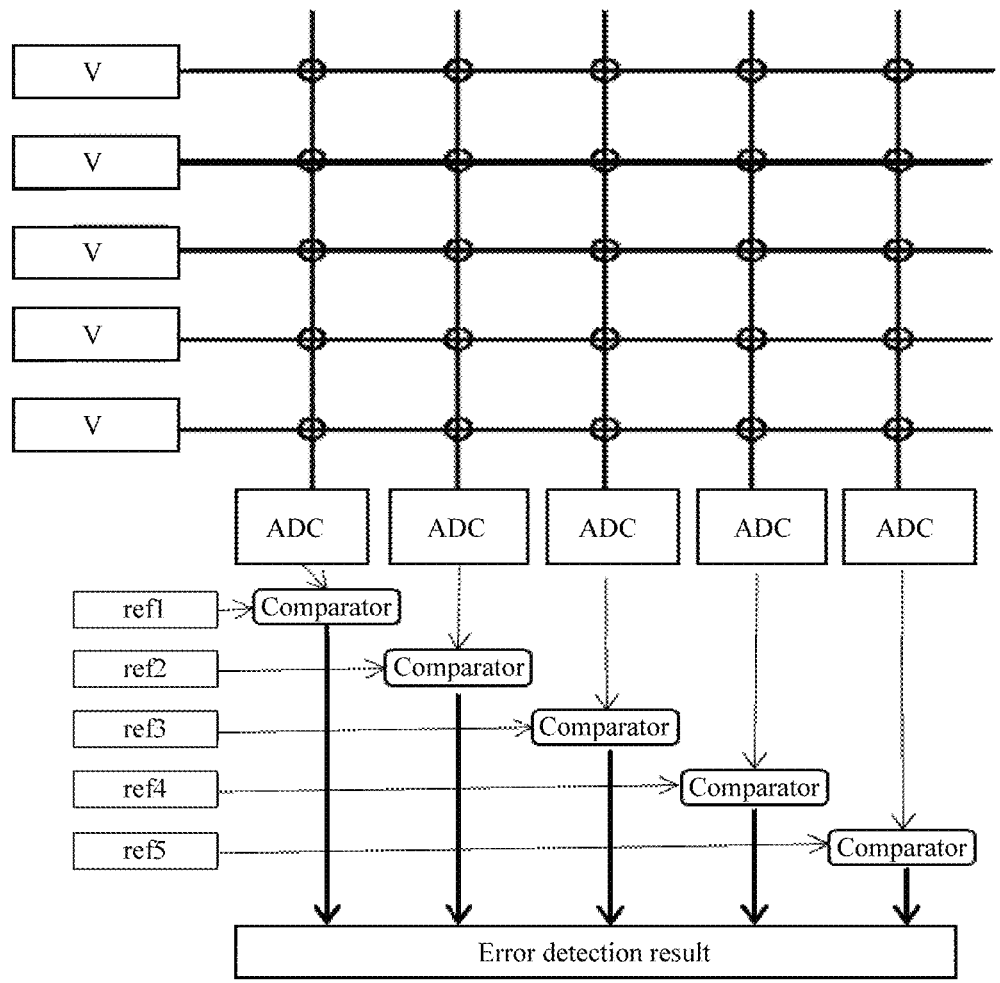
FIG. 8 is a schematic working diagram of an error detection module according to this application.

FIG. 8 shows a working principle of the error detection module. Stuck-at-0 and stuck-at-1 errors need to be detected by changing resistance of the RRAM and comparing the changed resistance with an ideal change result. Therefore, before error detection, all current resistance of the RRAM needs to be read and recorded. To improve error detection efficiency, a block error detection method may be used in this embodiment of the present disclosure. An original RRAM array is first divided into several mutually exclusive submatrices, and error detection is performed on each entire submatrix.

FIG. 8 shows an example error detection circuit with an array size of 5×5. (The array is an error detection subarray, and may be a part of the crossbar array (referred to as an original crossbar array below) in the foregoing description or the previous figure. Because the entire crossbar array is usually relatively large, the error detection module may successively perform error detection on error detection subarrays during the error detection.) When error detection is performed on the stuck-at-0 and stuck-at-1 errors, a minimum bias is first written for all RRAM cells in the subarray on which the error detection is to be performed, where a magnitude of the bias is determined by resistance precision of the RRAM device. To avoid write saturation of the resistance of the device, when the error detection is performed on the stuck-at-0 error, a minimum bias in reducing resistance (or increasing conductance) needs to be written. When the error detection is performed on the stuck-at-1 error, a minimum bias in increasing resistance (or reducing conductance) needs to be written. Then, an error detection voltage is applied to an input interface (the input interface is shown as the left side of FIG. 8) of the error detection subarray, and a calculation result after the bias is written is obtained on an output interface (the output interface is shown as ADCs at the lower side of FIG. 8) of the error detection subarray and is used as a to-be-compared signal through analog-to-digital conversion. Moreover, a minimum bias of a same magnitude is added to an original calculation result in a same column such that an ideal calculation result without an error can be obtained and is used as a to-be-compared reference signal. An actual result (that is, the to-be-compared signal) in each column is compared with the ideal result (that is, the to-be-compared reference signal). If the two results are the same, it is considered that the column includes no error. If the two results are different, it is considered that the column includes an error.

The RRAM device is characterized by bipolarity, and allows a reverse bias voltage to be applied. Therefore, an error detection voltage may be applied to the output interface of the error detection subarray, and the error detection circuit shown in FIG. 8 is connected to the input interface of the error detection subarray in order to perform error detection on RRAM rows. Finally, a row error detection result and a column error detection result of the subarray are combined. If a row and a column corresponding to a cell both include an error, it is considered that the cell possibly includes an error, and the error is recorded in the error distribution map Q shown in FIG. 7.

It is assumed that a size of the original crossbar array is M×N, and a size of the error detection subarray is S×T. Because column error detection may be performed on subarrays in a same row at the same time and row error detection may be performed on subarrays in a same column at the same time, error detection complexity can be effectively reduced in the method compared with an original one-by-one error detection method.

The following describes another apparatus embodiment of this application. The apparatus embodiment corresponds to the foregoing method embodiments and apparatus embodiments. Therefore, for parts that are not detailed, refer to the foregoing method embodiments and apparatus embodiments. Details are not described again.

Figure 9:
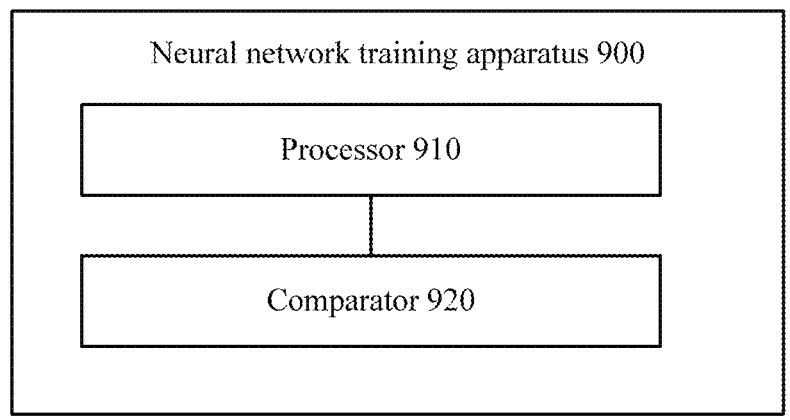
FIG. 9 is a schematic structural diagram of a neural network training apparatus according to yet another embodiment of this application.

FIG. 9 is a schematic structural diagram of a neural network training apparatus 900 according to an embodiment of this application. The neural network training apparatus 900 is applied to a RRAM, and the apparatus includes a processor 910 configured to input neuron input values <ri1, ri2, . . . , rin> of an $r^{th}$ layer of a neural network to the RRAM, and perform calculation for the neuron input values <ri1, ri2, . . . , rin> based on filters in the RRAM, to obtain neuron output values <ro1, ro2, . . . , rom> of the $r^{th}$ layer of the neural network, where n is a positive integer greater than 0, and m is a positive integer greater than 0, and perform calculation based on kernel values of the RRAM, the neuron input values <ri1, ri2, . . . , rin> of the $r^{th}$ layer of the neural network, the neuron output values <ro1, ro2, . . . , rom> of the $r^{th}$ layer of the neural network, and backpropagation error values <B1, B2, . . . , Bm> of the $r^{th}$ layer of the neural network, to obtain backpropagation update values <C1, C2, . . . , Cm> of the $r^{th}$ layer of the neural network, where the kernel values of the RRAM are matrix values of the filters in the RRAM, and the backpropagation error values <B1, B2, . . . , Bm> of the $r^{th}$ layer of the neural network are obtained based on the neuron output values <ro1, ro2, . . . , rom> of the $r^{th}$ layer of the neural network and neuron reference output values <rt1, rt2, . . . , rtm> of the $r^{th}$ layer of the neural network, and a comparator 920 configured to compare the backpropagation update values <C1, C2, . . . , Cm> of the $r^{th}$ layer of the neural network with a preset threshold, and when the backpropagation update values <C1, C2, . . . , Cm> of the $r^{th}$ layer of the neural network are greater than the preset threshold, the processor 910 updates the filters in the RRAM based on the backpropagation update values <C1, C2, . . . , Cm> of the $r^{th}$ layer of the neural network.

It should be noted that, the comparator 920 herein may be used as a part of the RRAM, or may be disposed independently of the RRAM. This is not limited herein.

According to this solution, an update operation in neural network training is determined by setting the preset threshold, and the update operation is performed only when the update value is greater than the preset threshold. Because weights in the neural network training are updated insignificantly on the whole, this solution can greatly reduce write/erase operations brought to the RRAM by a large quantity of update operations in the neural network training such that service life of the RRAM is prolonged. In addition, due to fewer update operations, a possibility of more hard errors in the RRAM is reduced such that reliability of the RRAM is ensured.

Optionally, in some embodiments, the processor 910 is further configured to generate the preset threshold, where the preset threshold includes a static threshold or a dynamic threshold, specifically, the static threshold means that the processor 910 sets preset thresholds of all layers of the neural network to be the same, and the dynamic threshold means that the processor 910 sets preset thresholds of different layers of the neural network to be different or partially different.

Optionally, in some embodiments, the comparator 920 includes the preset threshold, the preset threshold is a static threshold, and specifically, the static threshold means that the processor 910 sets preset thresholds of all layers of the neural network to be the same.

Optionally, in some embodiments, that the processor 910 sets preset thresholds of different layers of the neural network to be different or partially different includes the processor 910 sets the preset thresholds to decrease progressively layer by layer in reverse order of layers of the neural network, or sets preset thresholds of layers at the front of the neural network to be less than preset thresholds of layers at the rear of the neural network, where the layers at the front of the neural network are layers close to an input layer of the neural network and are a first layer to an $X^{th}$ layer, and the layers at the rear of the neural network are layers close to an output layer of the neural network and are an $(R-X)^{th}$ layer to an $R^{th}$ layer, where R is a total quantity of layers of the neural network, and X is greater than 1 and less than R.

In this embodiment of the present disclosure, in addition to the static threshold, the different or partially different thresholds may be set for the different network layers of the neural network, and the thresholds are referred to as the dynamic threshold above. Because error propagation of the neural network rapidly decreases from rear to front, this is equivalent to differentiation on errors layer by layer in a backpropagation process. Therefore, the backpropagation update value becomes extremely small after backpropagation is performed on a particular quantity of layers. The layers close to the input layer of the neural network are more sensitive to an update, and relatively small preset thresholds may be correspondingly used for the layers. The layers close to the output layer of the neural network are less sensitive to an update, and relatively large preset thresholds are correspondingly used for the layers. In this way, the different or partially different thresholds are set for the different layers of the neural network layer. This can make update operations more purposeful, and further ensures the service life of the RRAM.

Optionally, in some embodiments, the processor 910 is further configured to receive a hard error distribution map of the RRAM, and perform data rearrangement for the neural network based on the hard error distribution map of the RRAM, where the hard error distribution map is obtained by performing an error test on the RRAM by a peripheral circuit of the processor 910.

Optionally, in some embodiments, the processor 910 is specifically configured to arrange sparse data of the neural network into a stuck-at-0 hard error area on the RRAM based on the hard error distribution map of the RRAM.

It should be noted that, the error test may be a program or a test circuit, and carried on the RRAM for implementation.

It should be noted that the foregoing error test logic does not need to be performed in each time of iteration of the neural network. The error test may be performed before the neural network training, and the hard error distribution map of the RRAM is output in this embodiment of the present disclosure such that the processor 910 in this embodiment of the present disclosure performs rearrangement for the neural network based on the hard error distribution map. Alternatively, the error test may be performed after a particular quantity of iterations, because the hard errors of the RRAM may occur constantly in the neural network training. After a period of training, a phased error test is performed on the RRAM, a corresponding hard error distribution map of the RRAM is output, and then the processor 910 performs data rearrangement for the neural network based on the hard error distribution map of the RRAM. This helps fully utilize a stuck-at-0 hard error cell in the RRAM, and allocate the sparse data of the neural network to the stuck-at-0 error area as much as possible, thereby increasing usage of the neural network in the RRAM.

Optionally, in some embodiments, the hard error distribution map of the RRAM that is received by the processor 910 is obtained using an error test circuit. The error test circuit is specifically configured to write a test value for each cell in the RRAM, and compare the test value of each cell with an actually read value of each cell, to obtain a hard error status of each cell in the RRAM, where hard error statuses of the cells in the RRAM form the hard error distribution map of the RRAM. The error test circuit may exist independently of the processor 910, and is electrically connected to the processor 910.

A computer-readable storage medium is provided, including an instruction. When the instruction runs on a server or a terminal, the server or the terminal performs the neural network training method according to any one of the method embodiments.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing apparatus and unit, refer to a corresponding process in the foregoing method embodiments. Details are not described herein again.

In the several embodiments provided in this application, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not be performed. In addition, the displayed or discussed mutual couplings or direct couplings or communication connections may be implemented through some interfaces. The indirect couplings or communication connections between the apparatuses or modules may be implemented in electrical, mechanical, or other forms.

In addition, functional units in the embodiments of this application may be integrated into one processing unit, or each of the modules may exist alone physically, or at least two modules are integrated into one module.

When the functions are implemented in a form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A neural network training method, applied to a resistive random access memory (RRAM), wherein the method comprises:
   inputting neuron input values to the RRAM;
   performing calculations on the neuron input values based on filters in the RRAM to obtain neuron output values;
   obtaining backpropagation error values based on the neuron output values and neuron reference output values of the neural network;
   performing calculations based on kernel values of the RRAM, the neuron input values, the neuron output values, and the backpropagation error values to obtain backpropagation update values of the neural network, wherein the kernel values of the RRAM are matrix values of the filters in the RRAM;
   comparing the backpropagation update values with a preset threshold; and
   updating the filters in the RRAM based on the backpropagation update values when the backpropagation update values are greater than the preset threshold.

2. The neural network training method of claim 1, wherein the preset threshold is a static threshold or a dynamic threshold, wherein preset thresholds of all layers are the same when the preset threshold is the static threshold, or preset thresholds of different layers are different or partially different when the preset threshold is the dynamic threshold.

3. The neural network training method of claim 2, further comprising:
   performing an error test on the RRAM to output a hard error distribution map of the RRAM; and
   performing data rearrangement for the neural network based on the hard error distribution map of the RRAM.

4. The neural network training method of claim 2, wherein the preset thresholds of different layers are different or partially different when the preset threshold is the dynamic threshold, wherein the preset thresholds decrease progressively in a reverse order of layers when the preset thresholds are different, wherein preset thresholds of front layers are less than preset thresholds of rear layers when the preset thresholds are partially different, wherein the front layers of the neural network are layers close to an input layer, and wherein the rear layers are layers close to an output layer.

5. The neural network training method of claim 1, further comprising:
   performing an error test on the RRAM to output a hard error distribution map of the RRAM; and
   performing data rearrangement for the neural network based on the hard error distribution map of the RRAM.

6. The neural network training method of claim 5, wherein performing the data rearrangement for the neural network based on the hard error distribution map of the RRAM comprises arranging sparse data into a stuck-at-0 hard error area on the RRAM.

7. The neural network training method of claim 5, wherein performing the error test on the RRAM to output the hard error distribution map of the RRAM comprises:
   writing test values for cells in the RRAM; and
   comparing the test values with read values of the cells to obtain hard error statuses of the cells in the RRAM, wherein the hard error statuses form the hard error distribution map of the RRAM.

8. A neural network training apparatus, applied to a resistive random access memory (RRAM), wherein the apparatus comprises:
   a processor; and
   a memory coupled to the processor and storing instructions that, when executed by the processor, cause the neural network training apparatus to be configured to:
   input neuron input values to the RRAM;
   perform calculations on the neuron input values based on filters in the RRAM to obtain neuron output values;
   obtain backpropagation error values of the neural network based on the neuron output values and neuron reference output values of the neural network;
   perform calculations based on kernel values of the RRAM, the neuron input values, the neuron output values, and the backpropagation error values, to obtain backpropagation update values, and wherein the kernel values of the RRAM are matrix values of the filters in the RRAM;
   update the filters in the RRAM based on the backpropagation update values when the backpropagation update values are greater than a preset threshold; and
   compare the backpropagation update values with the preset threshold.

9. The neural network training apparatus of claim 8, wherein the instructions further cause the neural network training apparatus to be configured to generate the preset threshold, wherein the preset threshold comprises a static threshold or a dynamic threshold, wherein, for the static threshold, the instructions further cause the neural network training apparatus to be configured to set preset thresholds of all layers to be the same and wherein for the dynamic threshold, the instructions further cause the neural network training apparatus to be configured to set preset thresholds of different layers to be different or partially different.

10. The neural network training apparatus of claim 9, wherein the instructions further cause the neural network training apparatus to be configured to:
   receive a hard error distribution map of the RRAM; and
   perform data rearrangement for the neural network based on the hard error distribution map of the RRAM.

11. The neural network training apparatus of claim 9, wherein to set the preset thresholds of different layers to be different or partially different, the instructions further cause the neural network training apparatus to be configured to:
   set the preset thresholds to decrease progressively layer by layer in reverse order of layers; or
   set preset thresholds of front layers to be less than preset thresholds of rear layers, wherein the front layers are layers close to an input layer, and wherein the rear layers are layers close to an output layer.

12. The neural network training apparatus of claim 8, wherein the neural network training apparatus comprises the preset threshold, wherein the preset threshold is a static threshold, and wherein for the static threshold, that the instructions further cause the neural network training apparatus to be configured to set preset thresholds of all layers to be the same.

13. The neural network training apparatus of claim 8, wherein the instructions further cause the neural network training apparatus to be configured to:
   receive a hard error distribution map of the RRAM; and
   perform data rearrangement for the neural network based on the hard error distribution map of the RRAM.

14. The neural network training apparatus of claim 13, wherein the instructions further cause the neural network training apparatus to be configured to arrange sparse data into a stuck-at-0 hard error area on the RRAM based on the hard error distribution map of the RRAM.

15. A computer program product comprising computer-executable instructions stored on a non-transitory computer-readable medium that, when executed by a server or terminal, cause the server or the terminal to:
   input neuron input values to a resistive random access memory (RRAM);
   perform calculations on the neuron input values based on filters in the RRAM to obtain neuron output values;
   obtain backpropagation error values based on the neuron output values and neuron reference output values;
   perform calculations based on kernel values of the RRAM, the neuron input values, the neuron output values, and the backpropagation error values to obtain backpropagation update values, wherein the kernel values of the RRAM are matrix values of the filters in the RRAM;
   update the filters in the RRAM based on the backpropagation update values when the backpropagation update values are greater than a preset threshold; and
   compare the backpropagation update values with the preset threshold.

16. The computer program product of claim 15, wherein the instructions further cause the server or the terminal to generate the preset threshold, wherein the preset threshold comprises a static threshold or a dynamic threshold, wherein for the static threshold, the instructions further cause the server or the terminal to be further configured to set preset thresholds of all layers to be the same, and wherein for the dynamic threshold, the instructions further cause the server or the terminal to be further configured to set preset thresholds of different layers to be different or partially different.

17. The computer program product of claim 16, wherein the instructions further cause the server or terminal to:
   receive a hard error distribution map of the RRAM; and
   perform data rearrangement for a neural network based on the hard error distribution map of the RRAM.

18. The computer program product of claim 15, wherein the server or terminal comprises the preset threshold, wherein the preset threshold is a static threshold, and wherein for the static threshold, the instructions further cause the server or the terminal to be further configured to set preset thresholds of all layers to be the same.

19. The computer program product of claim 15, wherein the instructions further cause the server or terminal to:
   receive a hard error distribution map of the RRAM; and
   perform data rearrangement for a neural network based on the hard error distribution map of the RRAM.

20. The computer program product of claim 19, wherein the instructions further cause the server or terminal to arrange sparse data into a stuck-at-0 hard error area on the RRAM based on the hard error distribution map of the RRAM.

* * * * *

UNITED STATES PATENT AND TRADEMARK OFFICE
CERTIFICATE OF CORRECTION

| | | |
|---|---|---|
| PATENT NO. | : 11,475,300 B2 | Page 1 of 1 |
| APPLICATION NO. | : 16/714011 | |
| DATED | : October 18, 2022 | |
| INVENTOR(S) | : Jun Yao et al. | |

It is certified that error appears in the above-identified patent and that said Letters Patent is hereby corrected as shown below:

In the Claims

Claim 9, Column 23, Line 61: "the same and" should read "the same, and"

Signed and Sealed this
Twentieth Day of December, 2022

*Katherine Kelly Vidal*

Katherine Kelly Vidal
*Director of the United States Patent and Trademark Office*